United States Patent Office 3,652,602
Patented Mar. 28, 1972

3,652,602
DYESTUFFS OF THE TRIPHENYLROSANILINE SERIES AND PROCESS FOR THEIR PREPARATION
Gustav Schafer, Frankfurt am Main, and Ferdinand Quint, Cratzenbach, Germany, assignors to Farbwerke Hoechst Aktiengesellschaft vormals Meister Lucius & Bruning, Frankfurt am Main, Germany
No Drawing. Filed July 16, 1968, Ser. No. 745,119
Claims priority, application Germany, July 22, 1967, F 53,032
Int. Cl. C09b 11/20
U.S. Cl. 260—391    7 Claims

ABSTRACT OF THE DISCLOSURE

New asymmetrical di- and triphenylrosaniline dyestuffs which are substituted on one phenyl or naphthyl radical by fluorine, chlorine, bromine, iodine, alkyl of 1 to 4 carbon atoms, alkoxy of 1 to 4 carbon atoms, phenyl, nitro, cyano or sulfonamide group in m- or p-position to the imino group and a process for their preparation.

---

The present invention relates to mixtures of new, asymmetrical di- and triphenylrosaniline dyestuffs of the general formulae (1) and (2)

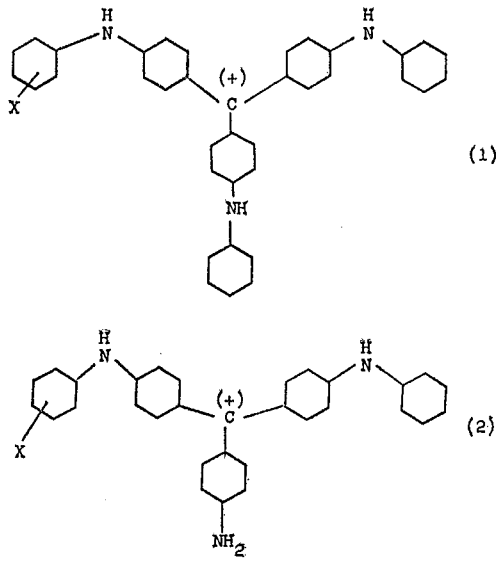

wherein X represents fluorine, chlorine, bromine, iodine, alkyl of 1 to 4 carbon atoms, alkoxy of 1 to 4 carbon atoms, phenyl, nitro, cyano or sulfonamide group being linked in m- or p-position to the imino group and a process for their manufacture.

It is known to prepare dyestuffs of the triphenylrosaniline series (rosaniline blue dyestuffs) by condensing p-trihalogen-triphenylmethylcarbinols, the salts or complex metal compounds thereof with aromatic amines carrying a substituent linked in m- or p-position to the amino group (German Pat. No. 1,098,652). Furthermore, there is described in literature the production of triphenylpararosaniline from p-trichlorotriphenylmethylcarbinol and aniline (Berichte der Deutschen Chemischen Gesellschaft, vol. 38, page 587, 1905) but no particulars about the yield are given. The process described gives yields amounting to 40% of the theoretical amount only and the product is obtained in a very impure form inadequate for industrial use (cf. German Pat. No. 1,098,652, column 2, lines 26 to 29). Only by the process described in German Pat. No. 1,098,652 it has become possible to prepare pure dyestuffs from trichlorotriphenylmethylcarbinol in excellent yield.

However, this process does not enable to obtain the reddish blue color bases chiefly required in practise for printing paper but substantially providing greenish blue color bases only. Therefore, in order to prepare the reddish blue color bases primarily used in practise the old rosaniline-blue process involving time-consuming working expenditure, an extraordinarily large volume of apparatus and poor yield of 27% only, calculated on the bases used has yet to be resorted to.

Surprisingly, it has now been found that mixtures of new, reddish asymmetrical di- and triphenylrosaniline dyestuffs of the preceding Formulae 1 and 2 can be prepared by reacting 1 mol of a complex-aluminium or a complex-iron compound of p- trichlorotrityl chloride with about 1 mol of a phenylamine being substituted in m- or p-position by halogen atoms such, for example, as fluorine, chlorine, bromine, or iodine, alkyl of 1 to 4 carbon atoms, alkoxy of 1 to 4 carbon atoms, phenyl, nitro, cyano or a sulfonamide group at temperatures of about 110° C. to about 135° C. preferably within the range from about 125° to about 130° C. in the presence of organic solvents being inert under the reaction conditions and by reacting the 4,4'-dichloro-4''-(m- or p-substituted phenylamino)-triphenyl-methylchloride thus formed with at least 5 mols of aniline at temperatures from about 145° to about 165° C., within the range from about 150° to about 160° C., preferably.

As organic solvents inert under the reaction conditions for example, chlorobenzene, dichlorobenzene, trichlorobenzene, nitrobenzene, nitromethane or tetrachloroethane or mixtures thereof are suitable. It is of advantage to use as inert solvent chlorobenzene, because it is suited to maintain the exothermic reactions of both steps in particular those of the first step, within a favourable range of temperature.

In the first-step conversion 1 mol of a complex-aluminium- or complex-iron compound of p-trichlorotritylchloride is suitably reacted with 1 mol of phenylamine being substituted in m- or p-position. However, the phenylamine may also be reacted in slight or moderate molar excess e.g. in the molar ratio 1:1, 1 liter of the liberated hydrogen chloride being then removed.

In the second step of the reaction wherein 1 mol of 4,4'-di-chloro-4''-(phenylamino)-triphenylmethyl chloride is reacted with at least 5 mols of aniline the aniline may be used, for example, in 6- to 8-molor excess.

The process of the present invention is preferably so conducted that the 4,4'-dichloro-4''-(m- or p-substituted phenylamino)-triphenylmethyl chloride formed within the first step is reacted with the aniline without an intermediate isolation.

In the first step of the reaction there proceeds in excellent yield, the replacement of one chlorine atom being in para-position in the p-trichlorotrityl chloride by a phenylamine radical substituted in m- or p-position as described above, whereby a compound of the formula

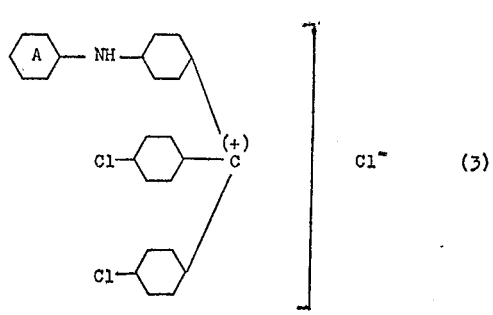

is formed, wherein the benzene nucleus A is correspondingly substituted in p- or m-position.

This exchange reaction does not necessitate the addition of a hydrochloric-acid-binding agent, the hydrogen chloride set free being removed during the reaction.

In reacting the compound of the preceding Formula 3 with an excess of aniline (2nd step reaction) reddish blue color bases are obtained which correspond in shade and their chemical properties to the known blue bases obtainable from pararosaniline and aniline (H. F. Fierz-David, "Künstliche organische Farbstoffe" (1926), p. 262 et seq.) As is well known, these blue bases are mixtures of di- and triphenyl pararosanilines. In the known process by which these blue bases are obtained the degree of phenylation and hence the color shade depends on the melting time insofar as with the increasing degree of phenylation the red shade of the pararosaniline shifts via a blue of a violet hue and via reddish blue to greenish blue.

Contrary thereto, the new process of the present invention is with regard to the formation of the reddish blue dyestuffs from the compounds formed at the first step of the reaction having the Formula 3 mentioned based on quite a different reaction mechanism. As a matter of fact, first both the remaining chlorine atoms being in p-position in the compound of Formula 3 are, as melting proceeds, replaced by phenylamino radicals. Surprisingly, however, concurrently there takes place a further reaction which proceeds in the form of gradual partial dephenylation and may be represented by the following reaction equation:

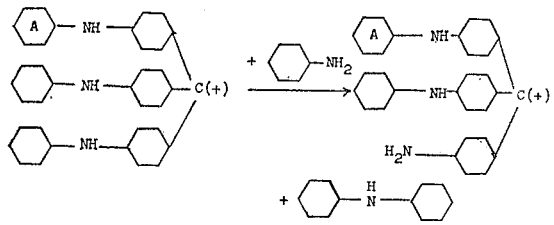

(The benzene nuclei A are substituted in m- or p-position as described above.)

This reaction is novel and has not been anticipated since unobserved before as side-reaction in the replacement of halogen atoms in p-position by arylamine radicals taking place in the triphenyl methane dyestuff series.

At the end of the instant process there results a mixture of new asymmetrical di- and triphenylated rosanilines of reddish blue color of the general Formulae 1 and 2, wherein the dyestuff of the Formula 1 mentioned represents about 90 to 50% by weight, that of Formula 2 about 10–50% by weight. The amount obtained of each component in the individual case depends on the temperature and time conditions chosen. The work up of the melt obtained by the process of the present invention in a known manner may be performed in different ways depending on the purpose the respective dyestuff is intended for.

The isolation of the dyestuff is most simply accomplished by stirring the melt with dilute mineral acid. Thus the dyestuffs precipitate in the form of their salts of mineral acids easily separable from the excess of aniline and the metal salts that enter into solution therein. Precipitating with concentrated mineral acid e.g. sulfuric acid of 30 to 60% strength leads to dyestuffs of a higher tinctorial strength since in that way also the diphenylamine bases split off in the reaction are separated. The dyestuffs prepared from the complex-aluminium compound may also be isolated by stirring out the melt with alkalies such as aqueous sodium or potassium hydroxide solution. The carbinol bases thus formed from the salts of the dyestuffs becomes dissolved in the excess of aniline, the aluminium salts entering the aqueous phase. The aniline solution is separated from the aqueous layer and the aniline distilled off in vacuo whereby the carbinol base is converted into an anhydro-base. Distillation in high vacuo e..g. in a falling-film evaporator where also the diphenylamine distils off to a large extent, leads to a rosaniline blue base with a higher tinctorial strength.

The reddish rosaniline blue dyestuffs are obtainable according to the process of the present invention in high yield and in the same purity as provides the old rosaniline blue process. The complex-aluminium or complex-iron compounds of the p-trichlorotrityl chloride which serve as starting compounds are prepared by reacting 4-chlorobenzotrihalides with an excess of chlorobenzene at about 50° to about 60° C. in the presence of approximately the theoretical amount of aluminium chloride or iron (III)-chloride and by separating the metal-complex compound having crystallised out, from the isomeric compounds that remain in solution in the excess of chlorobenzene [German Pats. Nos. 1,036,242 and 1,046,599]. The dyestuffs obtainable according to the present invention are preferably suited as printing inks for letter-press printing.

The following examples serve to illustrate the present invention but they are not intended to limit it thereto. The parts mentioned are meant by weight unless otherwise stated.

EXAMPLE 1

A solution of 200 g. of p-chlorobenzotrichloride in 200 g. of chlorobenzene was added dropwise while stirring for 3 to 4 hours at −10° to 25° C. to a mixture of 450 g. of chlorobenzene and 127.5 g. of aluminium chloride. Thereby the 4,4′-dichlorobenzophenone dichloride was formed. The whole was heated for 5 to 6 hours to 55°–60° C. Thus the crystals which possibly had precipitated become dissolved. After cooling the mixture below 0° C. the chlorobenzene in excess was filtered off with suction through a suspended glass frit from the complex-aluminium salt of the 4,4′,4″-trichlorotrityl chloride having crystallised out in the form of orange-red needles, then the mixture was washed with chlorobenzene. The contents of the flask comprising the 4,4′,4″-trichlor-trityltetrachloraluminate was mixed with 100 g. of b-toluidine and heated for 3 hours to 125°–130° whereby the dark red 4,4′-dichloro - 4″ - (m-methylphenylamino) - triphenylmethyl-chloride is formed with vigorous evolution of hydrogen chloride. Then 530 g. of aniline were introduced into the hot melt, the temperature raised to 150°–155° C. and the whole stirred until a sample exhibited in ethanol-glacial acetic acid the desired shade which occurs after 4–6 hours approximately. Towards the end of the reaction the chlorobenzene yet present is distilled under reduced pressure. Subsequently, the dark blue melt having a bronze lustre is stirred into 3 l. of dilute hydrochloric acid. The dyestuff precipitated in the form of chloride is after a short heating filtered off with suction, washed to neutral and dried in vacuo. The product is a violet powder having a bronze lustre dissolving in ethanol-glacial acetic acid with pure reddish blue color. The yield amounts to 400 g. of dyestuff being a mixture of two dyestuffs of the formulae

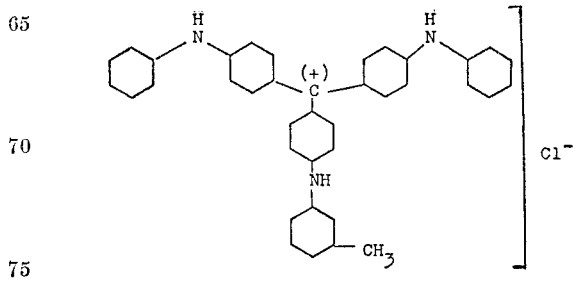

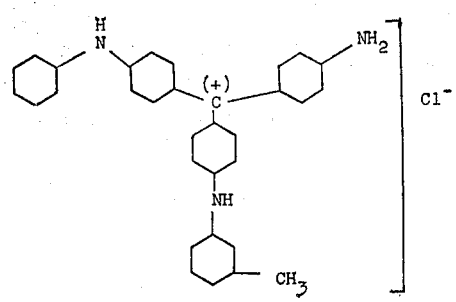

When the ready melt is stirred into sulfuric acid of 50% strength, and the mixture maintained for 2 to 3 hours at a temperature of 80° to 90° C., filtered off with suction, washed to neutral and dried, the sulfate of the dyestuff is obtained containing more of the pure product than the chloride, since also diphenylamine bases yet present become dissolved.

EXAMPLE 2

The complex-aluminium salt of the 4,4',4''-trichlorotritylchloride formed from 62.5 g. of p-chlorobenzotrichloride, 200 g. of chlorobenzene and 40 g. of aluminium chloride is converted by addition of 50 g. of m-toluidine and by heating 3 hours at 130° C. into the 4,4'-dichloro-4''-(m-methylphenylamino)-triphenylmethylchloride. The hot melt is added 115 g. of aniline and the temperature raised to 150°–155° C. In the course of 3 to 4 hours the melt shifts via green for a dark blue coloration having a strong bronze lustre. When a sample exhibits in ethanol-glacial acetic acid the desired reddish blue tint the melt is stirred into such an amount of dilute sodium hydroxide solution as is necessary to transform the dyestuff into the brown carbinol dissolved in aniline and for dissolving the aluminium chloride in the form of the aluminate. Then the mixture is boiled for a short time and the alkaline solution is separated off. The aniline is distilled off from the brown carbinol solution in vacuo at 140° to 150° C. whereby the carbinol base formed is converted into an anhydro-base. The yield amounts to 125–135 g. of color base being a mixture of the color bases of the formulae

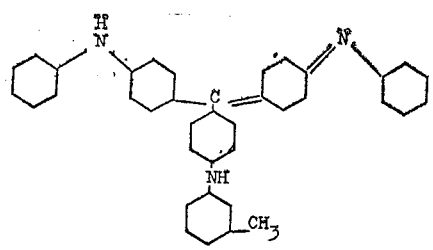

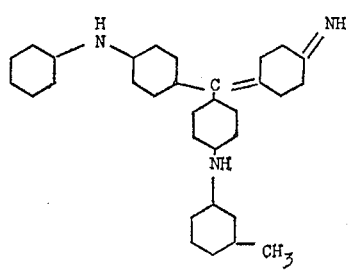

An anhydro base of higher purity is obtained by distilling at 160° to 170° C. 1 mm. Hg in a falling-film evaporator because diphenylamine bases yet present distill off. The yield amounts to 110–115 g. of color base. The product pulverizing readily dissolves in ethanol-glacial acetic acid with clear reddish blue colour.

EXAMPLE 3

120 g. of 4,4'4''-trichlorotrityl-tetrachloraluminate suspended in 100 cc. of chlorobenzene are stirred together with 39 g. of m-phenetidine over the course of 2 hours at 130° C. To the dark red melt 127 g. of aniline are added and the mixture is stirred at 150° to 155° C. until there is obtained the desired tint. Toward the end of the reaction the chlorobenzene is distilled off under reduced pressure, the mixture subsequently diluted with 50 g. of aniline and poured in 500 cc. of sodium hydroxide solution of 20% strength. After boiling for half an hour the aniline layer is separated and the aniline distilled off in vacuo. After cooling a brown brittle product is obtained pulverizing readily and which dissolves in ethanol-glacial acetic acid with a pure reddish blue colour. The yield amounts to 133 g. of colour base being a mixture of two colour bases of the formulae

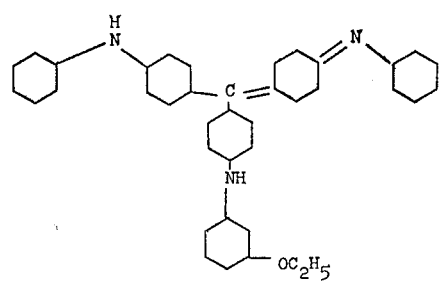

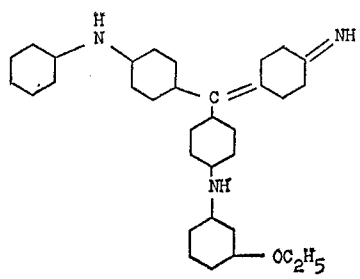

EXAMPLE 4

120 g. of 4,4',4''-trichlorotrityl-tetrachloraluminate are heated for 3 hours with 100 g. of chlorobenzene and 33 g. of p-chloraniline at 130° C. to be added 127 g. of aniline and stirred for 4 to 5 hours at 150 to 155° C. Toward the end of the reaction the chlorobenzene is distilled off in vacuo. After dilution with 70 g. of aniline the dark blue melt having a strong bronze lustre is run into 500 cc. of sodium hydroxide solution of 20% strength, the aqueous layer is separated and the aniline distilled off. The yield amounts to 139 g. of color base dissolving in ethanol-glacial acetic acid with a pure reddish blue color. The color base obtained is a mixture of two color bases of the formulae

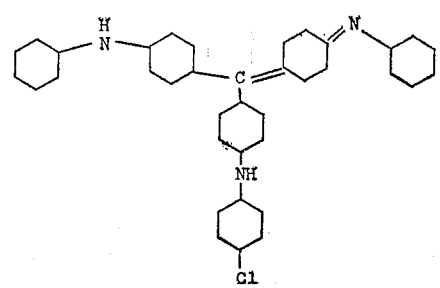

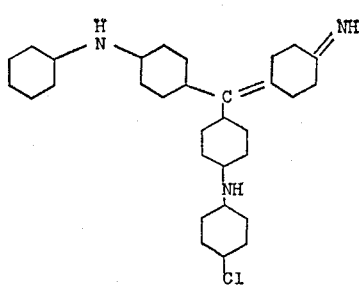

EXAMPLE 5

Into a suspension of 49 g. of anhydrous iron-(III)-chloride in 200 g. of chlorobenzene 62.5 g. of p-chlorobenzotrichloride are added dropwise within 3 hours at 20° to 25° C. followed by stirring for 1 hour and heating up to 55°–60° C. at which temperature the mixture is maintained for 5 hours. Already after one and a half hours the complex-iron compound crystallizes out from the red-brown solution in the form of orange-red needles having a brassy lustre. After cooling to —5° to 10° C. the excess of chlorobenzene is removed by filtration and the press cake washed with chlorobenzene.

Thereafter, 27.5 g. of m-toluidine are added stirring the mixture for two hours at 130° C. Then 127 g. of aniline are poured in and the mixture is stirred for 4–5 hours at 150° to 155° C. Subsequently, the melt exhibiting a strong bronze lustre is diluted with 100 cc. of aniline, run into 1.5 l. of sulfuric acid of 40% strength and the whole is stirred for 2 to 3 hours at 90° C. until the precipitated dyestuff has become finely grained. After filtering off with suction, washing to neutral and drying in vacuo a dark violet powder with a bronze lustre is obtained dissolving in ethanol-glacial acetic acid with a pure reddish blue color. The yield amounts to 147 g. of a product being a mixture of dyestuffs of the formulae

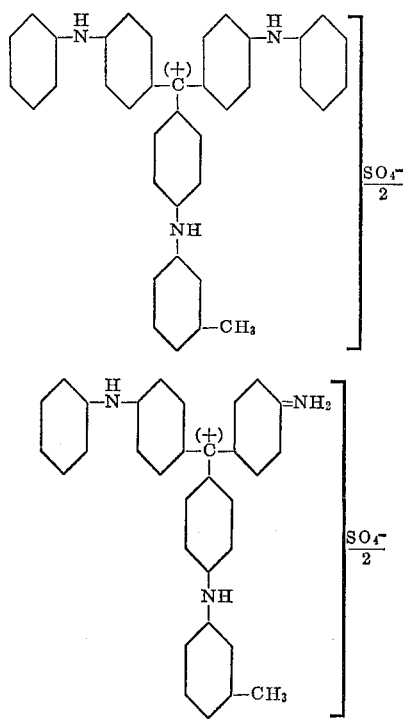

EXAMPLE 6

120 g. of 4,4′,4″-trichlorotrityl-tetrachloraluminate, 100 g. of chlorobenzene and 35.9 g. of m-nitroaniline are heated together for 2 hours at 130° C. and after addition of 127 g. of aniline stirred for 4 to 5 hours at 150° to 155° C. Toward the end of the reaction the chlorobenzene is distilled off under reduced pressure. Then the dark blue melt having a strong bronze lustre is diluted with 70 g. of aniline to be poured into 500 cc. of 20% sodium hydroxide solution. After the aqueous layer has been separated the aniline is distilled off in vacuo. The yield of colour base dissolving in ethanol-glacial acetic acid with a pure reddish blue colour amounts to 134 g. being a mixture of two colour bases of the formulae

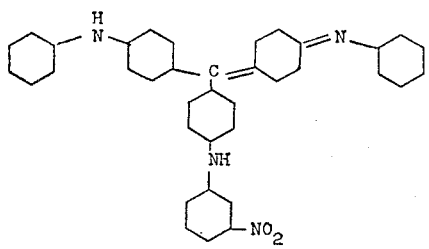

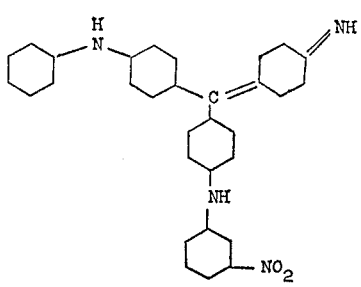

EXAMPLE 7

120 g. of 4,4′,4″ - trichlorotrityl - tetrachloraluminate, 100 g. of chlorobenzene and 30.4 g. of 4-aminobenzonitrile are heated at 130° C. for 2 hours. Subsequently 127 g. of aniline are added and it is stirred for a further 4 to 5 hours at 150°–160° C. Toward the end of the reaction the chlorobenzene is distilled off under reduced pressure. The dark blue melt having a strong bronze lustre is diluted with 70 g. of aniline and run into 500 cc. of sodium hydroxide solution of 20% strength. After separating the aqueous layer the aniline is distilled off in vacuo. The yield of the color base which dissolves in ethanol-glacial acetic acid with a pure reddish blue color amounts to 135 g. being a mixture of two color bases of the formulae

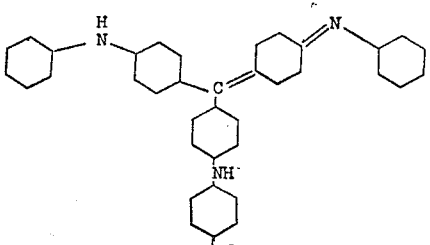

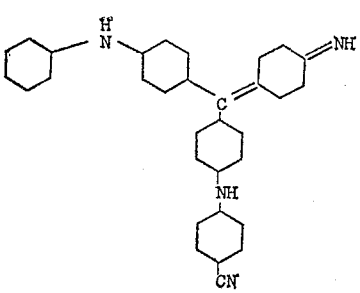

EXAMPLE 8

120 g. of 4,4',4" - trichlorotrityl - tetrachloraluminate, 100 g. of chlorobenzene and 35.4 g. of aniline-3-sulfonic acid-amide are heated for 2 hours at 130° C. and after addition of 127 g. of aniline, stirred for 4 to 5 hours at 150° to 155° C. Toward the end of the reaction the chlorobenzene is distilled off. The dark blue melt having a strong bronze lustre is poured after dilution with 70 g. of aniline into 500 cc. of sodium hydroxide solution of 20% strength. After the aqueous layer having been separated the aniline is distilled off in vacuo. The color base dissolving in ethanol-glacial acetic acid with a pure reddish blue color is obtained in a yield of 136 g. being a mixture of two dyestuffs of the formulae

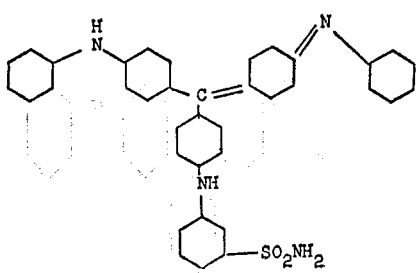

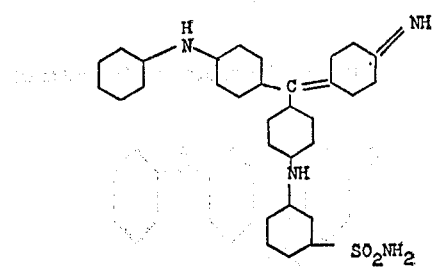

EXAMPLE 9

120 g. of 4,4',4" - trichlorotrityl - tetrachloraluminate, 100 g. of chlorobenzene and 29.6 g. of p-fluoraniline are heated for 2 hours at 130° C. and after addition of 127 g. of aniline stirred for 5 hours at 150° to 155° C. Toward the end of the reaction the chlorobenzene is distilled off in vacuo. The dark blue melt having a strong bronze lustre is poured after dilution with 100 cc. of aniline into 1 l. of 20% sulfuric acid, stirred for 1 hour at 70° to 80° C., filtered off with suction, washed to neutral and dried in vacuo. The yield amounts to 125 g. of dyestuff in the form of the sulfate dissolving in ethanol-glacial acetic acid with a pure reddish blue color and being a mixture of two dyestuffs of the formulae

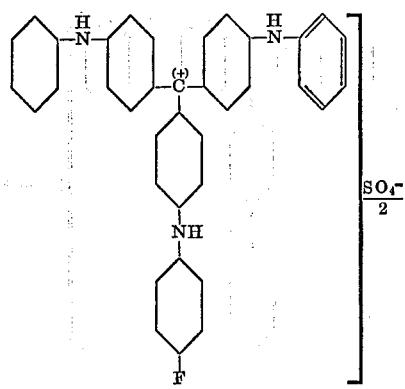

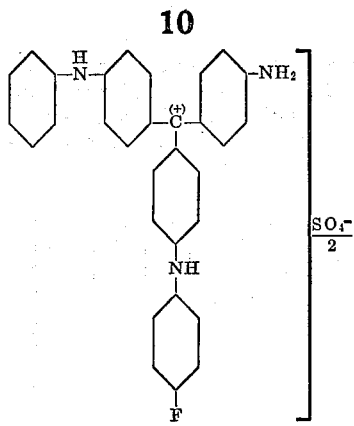

EXAMPLE 10

120 g. of 4,4',4"-trichlorotrityl-tetrachloraluminate, 100 g. of chlorobenzene and 46 g. of p-bromaniline are heated for 2 hours at 130° C., and after addition of 127 g. of aniline the mixture is stirred for a further 4 to 5 hours at 150° to 155° C. Toward the end of the reaction the chlorobenzene is distilled off in vacuo. After dilution with 100 cc. of aniline the dark blue melt having a strong bronze lustre is run into 1 l. of 20% sulfuric acid, stirred for 1 hour at 70° to 80° C. filtered off with suction, washed to neutral and dried in vacuo. The product is a dark violet powder dissolving in ethanol-glacial acetic acid with a pure reddish blue color. The yield amounts to 164 g. of dyestuff being a mixture of two dyestuffs of the formulae

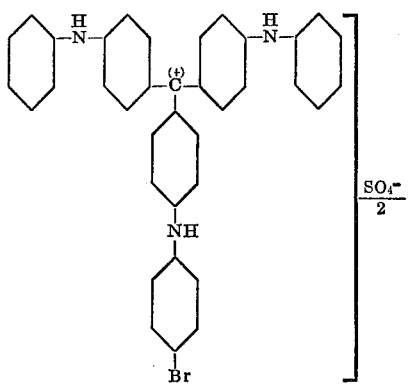

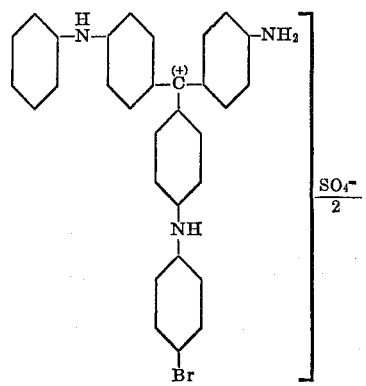

EXAMPLE 11

120 g. of 4,4',4"-trichlorotrityl-tetrachloraluminate, 100 g. of chlorobenzene and 58.5 g. of p-iodaniline are stirred for 2 hours at 130° C. and after addition of 127 g. of aniline the mixture is stirred further for 4 to 5 hours at 150° to 155° C. During the condensation iodine splits off. Toward the end of the reaction the chlorobenzene is distilled off in vacuo. The dark blue melt having a strong bronze lustre is poured after dilution with 100 cc. of aniline in 1 l. of sulfuric acid of 20% strength, stirred for 1 hour at 70° to 80° C., filtered off with suction, washed to neutral and dried in vacuo. A brown powder dissolving in ethanol-glacial acetic acid with a pure reddish blue color is obtained at a yield of 140 g. of dyestuff being a mixture of two dyestuffs of the formulae

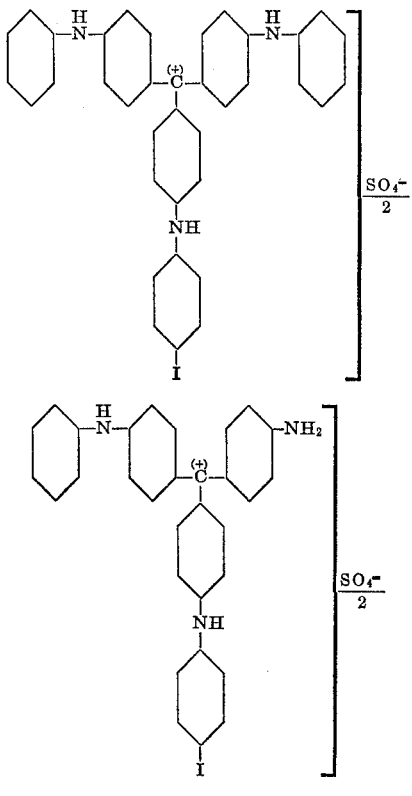

EXAMPLE 12

A suspension of 60 g. of 4,4',4''-trichlorotrityl-tetrachloraluminate in 60 cc. of chlorobenzene is heated while stirred with 15.5 g. of m-toluidine for 2 hours at 130° C. To the resulting dark red solution 64 g. of aniline are added in several portions while the temperature is raised to 150°–155° C. stirring further until the desired blue tint is obtained. Toward the end of the reaction the chlorobenzene is distilled off in vacuo. The melt obtained is run into 250 cc. of 20% sodium hydroxide solution while stirring at 90° to 100° C. until the dyestuff has been converted into the carbinol base. Then the aqueous aluminate layer is allowed to deposit being then separated. In order to isolate and simultaneously purify the blue base the aniline solution is mixed with 250 g. of aqueous alcohol (for example methanol), stirred for one hour at 70° C., allowed to deposit and separated, the alcohol dissolved in the resin-like colour base obtained being distilled off. As residue from distillation a pure rosaniline blue base is obtained in good yield. From the alcohol layer methanol, aniline and diphenylamino bases are easily obtainable by distillation. The resulting dyestuff consists of 2 dyestuffs of the formulae

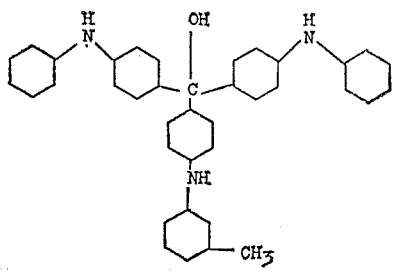

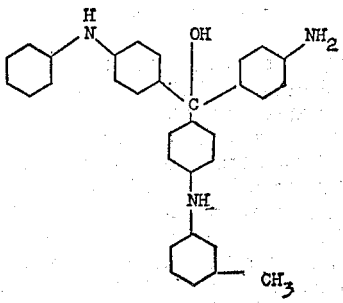

We claim:
1. A mixture of an asymmetrical diphenylrosaniline of the formula

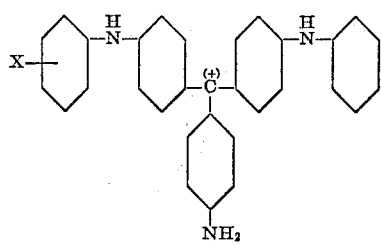

and an asymmetrical triphenylrosaniline of the formula

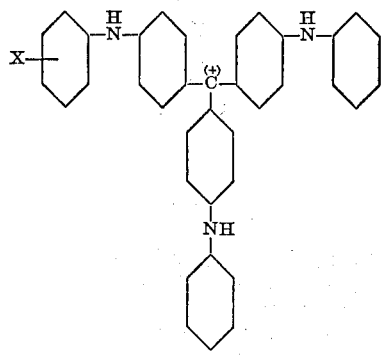

wherein X is a fluorine, chlorine, bromine, iodine, alkyl of 1 to 4 carbon atoms, alkoxy of 1 to 4 carbon atoms, phenyl, nitro, cyano or sulfonamide group and is linked at m- or p-position to the imino group.

2. The dyestuff mixture consisting of the dyestuffs of the formulae

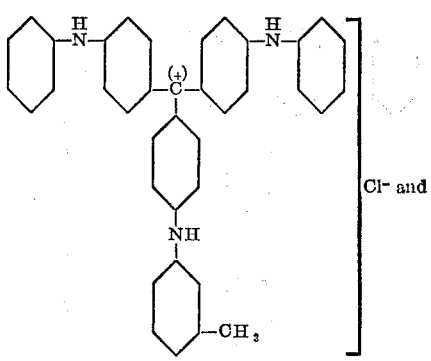

and

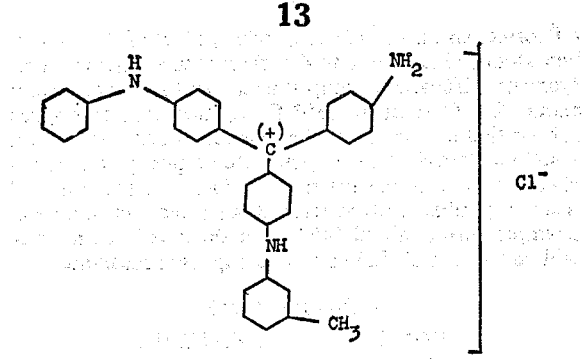

3. The dyestuff mixture consisting of the dyestuffs of the formulae

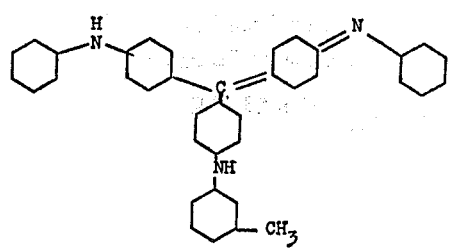

and

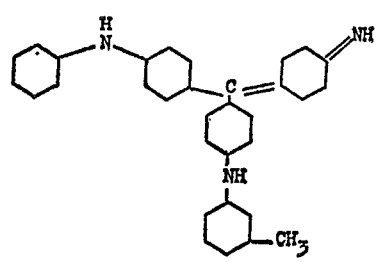

4. The dyestuff mixture consisting of the dyestuffs of the formulae

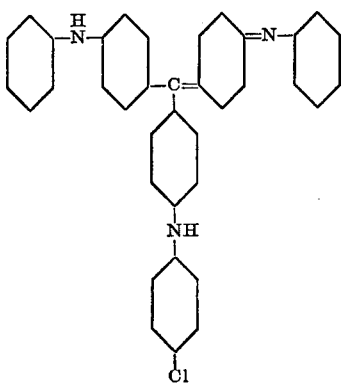

and

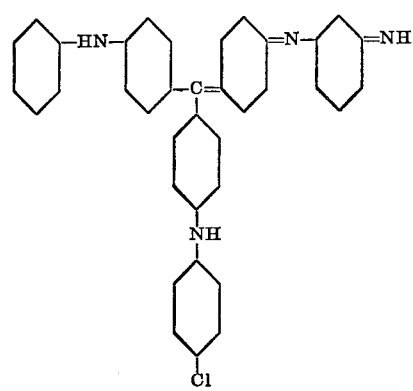

5. The dyestuff mixture consisting of the dyestuffs of the formulae

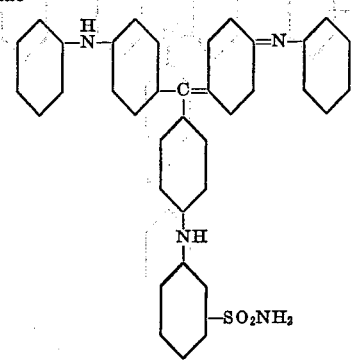

and

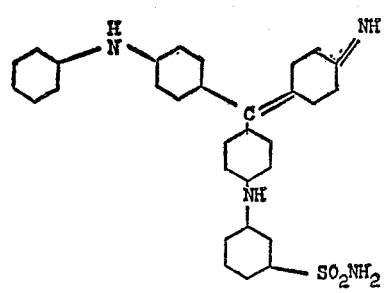

6. The dyestuff mixture consisting of the dyestuffs of the formulae

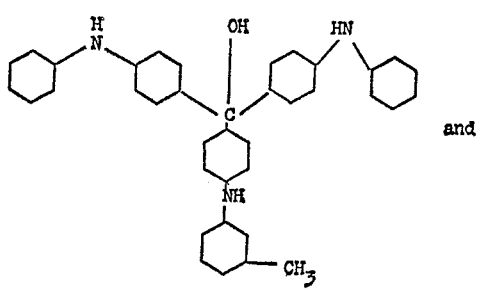

and

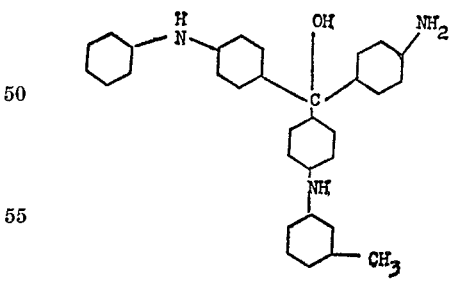

7. A process for the preparation of a mixture of an asymmetrical diphenylrosaniline of the formula

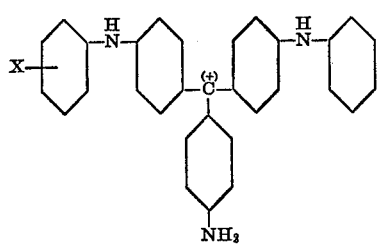

and an asymmetrical triphenylrosaniline of the formula

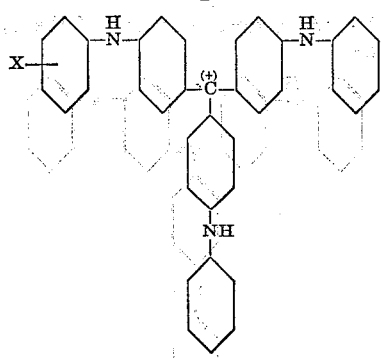

wherein X is a fluorine, chlorine, bromine, iodine, alkyl of 1 to 4 carbon atoms, alkoxy of 1 to 4 carbon atoms, phenyl, nitro, cyano or sulfonamide group and is linked at m- or p-position to the imino group, which process comprises reacting 1 mol of an aluminum or iron complex compound of the p-trichlorotritylchloride with about 1 mole of a phenylamine substituted at m- or p-position by a fluorine, chlorine, bromine, iodine, alkyl of 1 to 4 carbon atoms, alkoxy of 1 to 4 carbon atoms, phenyl, nitro, cyano or sulfonamide group at a temperature ranging from about 125° C. to about 130° C. together with an organic solvent that is inert under the reaction conditions to form a 4,4′-dichloro-4″-(m- or p-substituted phenylamino)-triphenylmethylchloride reaction product, and reacting said reaction product with at least about 5 mols of aniline at a temperature of about 145° C. to about 165° C. to form said asymmetrical diphenyl- and triphenyl-rosanilines.

References Cited
UNITED STATES PATENTS

| | | | |
|---|---|---|---|
| 2,755,203 | 7/1956 | Stallmann | 260—391 |
| 3,184,483 | 5/1965 | Quint et al. | 260—391 |

LEWIS GOTTS, Primary Examiner

L. A. THAXTON, Assistant Examiner

U.S. Cl. X.R.

260—387, 390, 392